United States Patent

Huston et al.

Patent Number: 5,811,822
Date of Patent: Sep. 22, 1998

[54] OPTICALLY TRANSPARENT, OPTICALLY STIMULABLE GLASS COMPOSITES FOR RADIATION DOSIMETRY

[75] Inventors: Alan L. Huston; Brian L. Justus, both of Springfield, Va.

[73] Assignee: The United States of America as represented by the Secretary of the Navy, Washington, D.C.

[21] Appl. No.: 848,259

[22] Filed: Apr. 29, 1997

[51] Int. Cl.$^6$ .............................. G01T 1/115; G01T 1/105
[52] U.S. Cl. ................................. 250/484.4; 250/483.1; 252/301.4 R
[58] Field of Search ........................... 250/484.4, 484.2, 250/484.3, 484.5, 483.1, 337; 252/301.4 R, 301.6 S

[56] References Cited

U.S. PATENT DOCUMENTS

| | | |
|---|---|---|
| 5,119,460 | 6/1992 | Bruce et al. . |
| 5,531,928 | 7/1996 | Karem et al. . |
| 5,547,807 | 8/1996 | Leblans et al. . |
| 5,568,497 | 10/1996 | Bishop et al. . |
| 5,585,640 | 12/1996 | Huston et al. . |

Primary Examiner—Edward P. Westin
Assistant Examiner—Richard Hanig
Attorney, Agent, or Firm—Thomas McDonnell; Barry Edelberg

[57] ABSTRACT

An optically transparent and optically stimulable glass composite includes a glass matrix that has both luminescent centers and trapping centers. The trapping centers store trapped charges and, in response to optical stimulation, release the charges resulting in recombination and light emission. In one embodiment, the invention is a glass matrix doped with an alkaline earth sulfide, Sm ions, and an additional dopant such as Eu ions and Ce ions. Alternatively, the dopants may be ZnS and Cu, Pb, or Mn ions. In another embodiment, Cu may be the sole dopant. Several different preparation methods, including diffusion techniques, are described for producing the doped glasses.

22 Claims, 4 Drawing Sheets

OPTICALLY TRANSPARENT, OPTICALLY STIMULABLE GLASS COMPOSITES FOR RADIATION DOSIMETRY

BACKGROUND OF THE INVENTION

1. Field of the Invention

The present invention relates generally to optically transparent, radiation sensitized glass phosphors. More specifically, the present invention relates to optically stimulable, optically transparent, radiation sensitized glass phosphors where the radiation sensitivity includes exposure to photons with energies that correspond to the electromagnetic spectrum ranging from γ-rays to the near ultraviolet, particle radiations including charged particles such as electrons, protons, alpha particles and other energetic ions. The radiation sensitivity manifests itself in the trapping of charged species (electrons or holes) in the glass matrix upon exposure to the radiation source, the trapped charged species remaining trapped until exposure to an optical stimulation source. Generally, this optical stimulation source consists of a light source emitting a light wavelength or a range of wavelengths in the region between 0.3 μm and 10 μm (near UV through the infrared). The optical stimulation source causes the trapped charges to recombine with the subsequent emission of light.

2. Description of the Background Art

Materials used for detecting infrared light by stimulating upconverted visible luminescence have been intensively studied for decades. Early work during the 1940's determined that the most efficient materials were polycrystalline alkaline earth sulfides such as SrS or CaS doped with trivalent rare earth activator and coactivator ions such as Sm paired with Ce or Eu. Presently, the most widely used optically stimulable luminescent (OSL) phosphors have evolved very little from the early formulations. These phosphors are typically micron-sized powders or polycrystalline films that absorb ionizing radiation (γ-ray, x-ray, β−), or UV radiation and store a portion of the absorbed energy in the form of trapped charges. The trapped charges are stable until the phosphor is illuminated with a light source capable of stimulating luminescent electron-hole recombination. For the particular case of bulk SrS doped with Eu and Sm, exposure to ionizing radiation results in the formation of a broad absorption (or stimulation) band that extends from approximately 800 nm to 1200 nm, with a peak at about 1050 nm. Irradiation by light within this absorption band stimulates a shorter wavelength luminescence, at approximately 600 nm, that corresponds to $Eu^{3+}$ emission. This behavior is typical within the family of similarly doped alkaline earth sulfides with modest differences in the positions of the radiation induced absorption bands. The presence of both the Sm ion activator and the $Eu^{3+}$ ion coactivator dopants is essential for IR stimulation. The IR stimulation band is believed to be the result of absorption by $Sm^{2+}$ ions while the spectral signature of the OSL is associated with the coactivator, $Eu^{3+}$.

OSL materials have been proposed for use in many applications including optical data storage, optical processing, radiation imaging, infrared detection and radiation dosimetry. Traditional OSL phosphors are highly scattering to visible light, due to the micron-sized features of the powders or films. The OSL is severely attenuated due to the scattering, thereby not only reducing the brightness of the emission, but also placing a practical limitation on the thickness and functionality of the phosphor for many applications.

Huston et al., U.S. Pat. No. 5,565,840, issued Dec. 17, 1996, entitled GLASS MATRIX DOPED WITH ACTIVATED LUMINESCENT NANOCRYSTALLINE PARTICLES (the entirety of which is incorporated herein by reference, for all purposes) discloses several types of optically transparent, thermoluminescent glasses that operate through a charge trapping mechanism, including an externally heated thermoluminescent glass. Laser heated thermoluminescent glasses are discussed, for example, in Huston et al., U.S. Pat. No. 5,565,840, issued Dec. 17, 1996, the entirety of which is incorporated herein by reference for all purposes. For the thermoluminescent glasses, luminescent recombination of electron-hole pairs is induced by applying enough heat to overcome the thermal barrier to recombination. In the case of the optically stimulable phosphor, recombination is induced by exposure to a light source with a wavelength that overlaps the radiation induced absorption band in the OSL material. Optical stimulation has a number of advantages over thermal stimulation such as an absence of thermal quenching of the luminescence, little or no bulk heating of the glass, and a very rapid readout.

SUMMARY OF THE INVENTION

Accordingly, it is an object of this invention to provide an optically transparent, optically stimulable, radiation-sensitive luminescent glass.

It is another object of the present invention to improve the performance of OSL phosphors by eliminating light losses due to optical scattering.

It is a further object of the present invention to provide phosphors having enhanced brightness by the process of optical waveguiding in the glass.

These and additional objects of the invention are accomplished by a glass matrix including luminescent centers and trapping centers. The trapping centers are capable of storing charges (electrons or holes) for extended periods of time. The trapped charges may be stimulated to recombine by the application of optical energy, resulting in the emission of light energy. In several embodiments, the present invention is a glass (e.g., fused quartz, fused silica, alumina glass, or borate glass) matrix including an alkaline earth sulfide doped with an activator/co-activator pair of samarium and another rare earth element. In other alternative embodiments, a glass (e.g., silica, alumina, or borate glass) matrix is doped with ZnS and copper, lead, manganese, or cerium. In yet another embodiment, a glass (e.g., silica, alumina, or borate glass) matrix is doped with Cu or Ce.

BRIEF DESCRIPTION OF THE DRAWINGS

A more complete appreciation of the invention will be readily obtained by reference to the following Description of the Preferred Embodiments and the accompanying drawings in which like numerals in different figures, where present, represent the same structures or elements, wherein.

DESCRIPTION OF THE PREFERRED EMBODIMENTS

Figure 1:
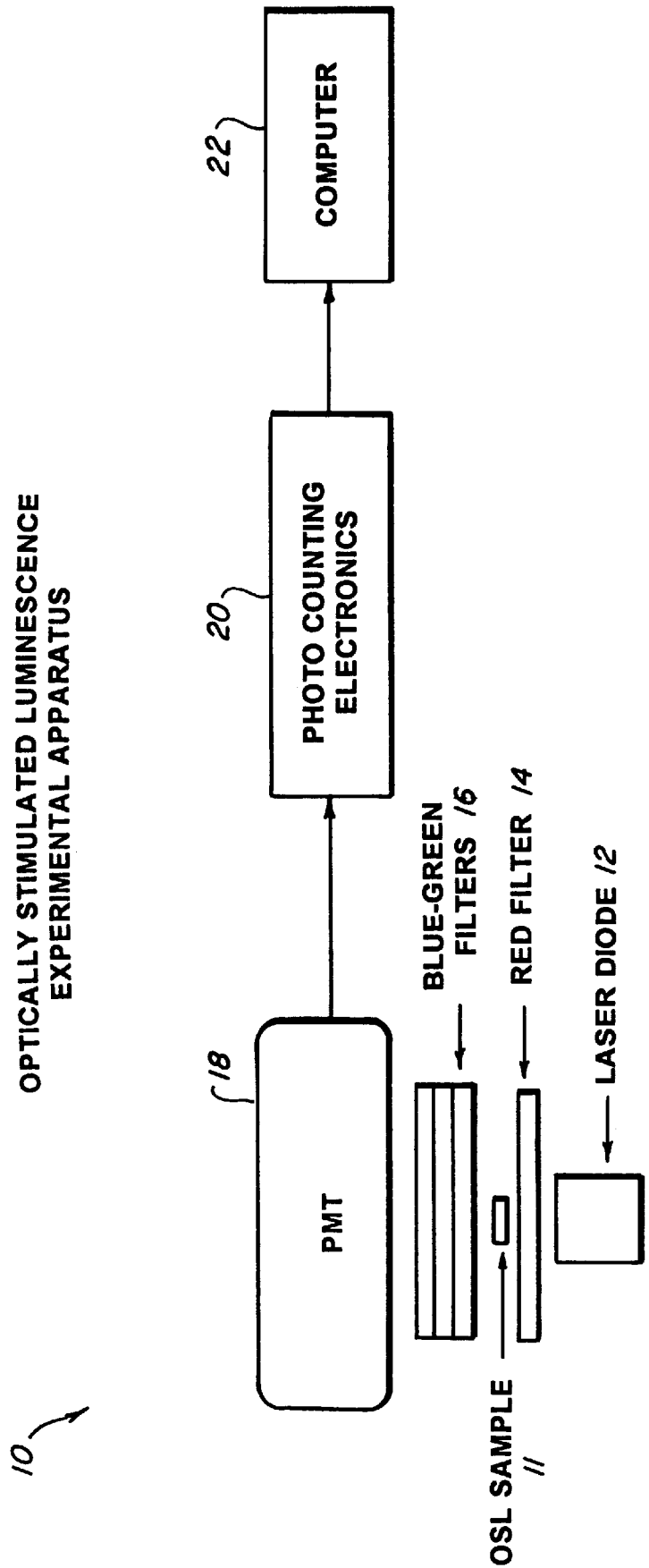
FIG. 1 is a schematic illustration of an experimental apparatus for demonstrating optically stimulated luminescence from samples according to the present invention.

In a first embodiment, the present invention includes a glass matrix incorporating an alkaline earth sulfide doped with an activator/coactivator pair. The activator/coactivator pair includes samarium and an additional rare earth. In a second embodiment, the glass matrix includes ZnS doped with copper, lead, manganese, or cerium. In the first and second embodiments, more than one coactivator may be used. In a third embodiment of the present invention, the glass matrix includes copper and/or cerium, and lacks any metal sulfide component.

In the first embodiment, any alkaline earth sulfide may be used as the alkaline earth sulfide dopant. Typical alkaline earth sulfides useful in the present invention include MgS, CaS, SrS, and BaS.

When more than one co-activator is used, the additional coactivator is typically Eu, Ce, or a mixture thereof. Other rare earths should also be useful, in place of or in combination with Eu and/or Ce, as additional co-activators.

The second embodiment of the present invention also employs a sulfide component and an activator. In this second embodiment, however, the metal sulfide component is ZnS, and only a single activator, such as Cu, Pb, Mn, or Ce is required. In a third embodiment of the present invention, the glass matrix includes Cu or Ce dopants in the absence of a metal sulfide component, or even in the absence of any sulfide component. For the purpose of the present specification and claims, a glass is considered essentially free of a component if the glass lacks an amount of that component sufficient to significantly alter the optical stimulability or radiation sensitiveness of the glass.

In each of the embodiments of the present invention, the optically stimulable glasses are typically prepared by diffusing the dopants (including sulfide components) into the glass matrix. Because the dopants are diffused into the glass matrix, the glass matrix may be either porous or fused (non-porous).

The dopants may be diffused into the glass matrix by a wide variety of methods. For example, if the glass matrix is porous, it may be contacted with a solution of salts of the desired dopant metals for a sufficiently long time to diffuse the salts into the porous glass. Thereafter, the porous glass matrix is dried. In those embodiments that include a metal sulfide component that would be insoluble in the dopant solution used, the dopant solution may contain a soluble salt of the metal portion of the sulfide. After drying, the glass may be sulfided (for example by exposure to gaseous $H_2S$ at elevated temperatures, typically about 100° C.) to provide the desired metal sulfide diffused into the porous glass. The porous glass matrix is then consolidated and activated, for example using any of the consolidation and/or activation methods described in Huston et al., supra.

In fused glass, the dopants may be diffused, for example, by dipping the fused glass matrix into an organic-inorganic sol gel (e.g., an organosilicate sol gel) including a salt or salts of the dopant metals. The fused glass matrix is then withdrawn from the sol gel at a slow, steady rate to result in the formation of a porous, thin (typically less than about one micron thick) sol-gel film containing the salt or salts. Upon drying (typically at room temperature to about 200° C.), the organic constituents of the film volatilize and/or decompose, leaving behind a porous, film (a high silica film where an orgaosilicate sol-gel was used) containing the salts. The glass having the porous film thereon may be sulfided (for example by exposure to gaseous $H_2S$ at elevated temperatures, typically about 100° C.) to provide metal sulfides, if desired. The resulting material is then activated, typically after being placed within a glass (e.g., silica) tube that is then placed within a tube furnace. If sulfiding is not desired, the decomposition and activation steps may be combined, for example, by heating the sol-gel film to a sufficiently high temperature to decompose the organics and diffuse the resulting metal(s) into the glass and activate them. Appropriate conditions for activation are the same as those described for the activation of porous glasses. Of course, the fused glasses made according to the present invention do not require consolidation. Porous glass matrices may also be doped using this sol gel method.

After several doping operations have been performed, the fused glass tube used to hold the glass samples during activation becomes a source of dopants. Untreated glass (fused or porous) may then be doped and activated by heating to activation temperatures of typically over 1000° C. while inside the previously used glass tube. This effect apparently results from a "seasoning" of the glass with small amounts of the dopant ions. During heat treatment, a low vapor pressure of the dopant atoms or ions is created that bathes the undoped glass in a doping atmosphere. The doping elements diffuse into the fused or porous glass material. The OSL activity of fused glasses treated in this manner may be further enhanced by repeated heat treatments in the presence of unconsolidated metal sulfide-containing pieces of Vycor™ or other porous glass.

As should be apparent from the above description of doping untreated glasses by heat treatment within a "seasoned" fused glass (e.g., silica, alumina, or borate) tube, the dopants need be present in only minute amounts within the glass to cause significant and useful OSL activity. Thus, it is extremely difficult to quantitatively define a minimum dopant level required to obtain useful OSL properties. The maximum doping level is that at which either the dopants within the glass matrix obtain crystallite sizes sufficiently large to significantly increase scattering, or the OSL effect is significantly attenuated by a self-quenching mechanism.

The dopant salts used in the solutions and sol gels discussed above are typically selected so that the salt is soluble in the solution or sol gel and the anion component of the salt, upon reduction, forms a gas or mixture of gases that are non-reactive, or beneficially reactive, with the doped glass matrix. The concentrations of these salts in the sol gels and solutions may vary widely. For example, each salt is typically present at a concentration of about 0.001 g per 100 ml solution up to its saturation point at the temperature at which the glass matrix is contacted with the solution or sol gel.

The glass matrix provides a mechanically robust, chemically inert phosphor material that is fully compatible with high quality, commercial optical fibers. The material withstands cycling through temperature extremes of up to 1200° C., without any apparent loss in performance. The glass matrix may be doped in bulk form or may be doped in the form of powders or fibers (e.g., glass wool). Also, if desired, a doped bulk glass matrix may be powdered or drawn into fibers.

The optical transparency of the glass provides for applications that are not possible using traditional powder phosphors. Optically transparent OSL glass sheets allow for diffraction limited radiation imaging applications. The glass sheets also act as waveguides that trap a significant percentage of any light that originates within the material, by total internal reflection, and guide it to the edges. This provides for the fabrication of thin, large area sheets of OSL glass for detecting radioactive particles such as α, β and tritium. These particles do not penetrate deeply into the material, but the waveguiding property of the glass provides for efficient detection. The OSL readout process is much faster than thermal readout methods, making possible, much faster image processing.

Having described the invention, the following examples are given to illustrate specific applications of the invention including the best mode now known to perform the invention. These specific examples are not intended to limit the scope of the invention described in this application.

EXAMPLES

EXAMPLE 1.

SrS:Eu,Sm in Vycor Glass

This OSL glass was prepared by diffusing a solution of $Sr^{2+}$, $Eu^{3+}$ and $Sm^{3+}$ salts into porous Vycor (Corning Inc., type 7930) glass. Porous Vycor glass consists of a tortuous, interconnected network of pores having an average pore diameter of approximately 40 Å and a void volume of approximately 30%. The porous nature of the Vycor glass allows the dopant salts to diffuse throughout the volume of the glass.

1 g $Sr(NO_3)_2 \cdot 6H_2O$ 0.3 g $EuCl_3$ 0.3 g $Sm(NO_3)_3$ were dissolved in 100 ml distilled water containing 1 ml concentrated $HNO_3$. After the salts dissolved, samples of porous Vycor glass were added to the solution. The solution was allowed to diffuse completely throughout the porous glass, usually for about two hours. The glass was then removed from the solution and allowed to dry for at least 24 hours. The dried glass was then placed in a glass flask that was heated to approximately 100° C. $H_2S$ gas was then flowed through the flask for approximately two hours to form metal sulfides inside the porous glass matrix. The sulfided glass was then removed from the flask and placed into a fused quartz tube with an inside diameter of 1 to 2 cm . The fused quartz tube containing the sulfided glass was placed inside a tube furnace and the temperature was increased slowly from room temperature to approximately 300° C. over a period of two hours, The temperature was then increased to 450° C. over the next hour. The temperature was increased again to 600° C. over the next hour. Finally, the temperature was increased to 1100° C. and maintained at this temperature for at least 6 hours. The tube furnace was then turned off and the glass samples were allowed to cool to room temperature over a period of two to three hours. This process resulted in optically transparent glasses that exhibited minimal visible light scattering. The consolidated glass had the mechanical properties of a high silica glass and could be sectioned and polished, or drawn into fibers as required. When exposed to a UV lamp, the glass luminescence was a mixture of blue and red. The blue emission is associated with $Eu^{2+}$ ions while the red emission is due to $Eu^{3+}$ ions.

EXAMPLE 2.

SrS:Eu,Sm in Fused Quartz Glass

A second method for preparing optically transparent OSL glasses utilized $Sr^{2+}$, $Sm^{3+}$ and $Eu^{3+}$ salts in solution containing tetraethylorthosilicate (TEOS), methanol, water and a small amount of nitric acid. The TEOS solution is a standard recipe used for preparing sol gel films by dip coating or spin coating.

1 g $Sr(NO_3)_2 6H_2O$ 0.3 g $EuCl_3$ 0.3 g $Sm(NO_3)_3$ were dissolved in a solution consisting of 50 ml TEOS, 30 ml Methanol, 20 ml $H_2O$ and 1 ml $HNO_3$. A fused quartz substrate, either a rod, plate or a fiber, was dipped into the solution and withdrawn at a slow, steady rate resulting in the formation of a porous, thin (less than 1 $\mu$ thick) film of organosilicate material, containing the metal salts. The coated substrate was then heated to a temperature of approximately 300° C. which resulted in the decomposition of the organic components of the film, leaving behind a porous, high silica film containing the metal salts. This material was then exposed to $H_2S$ gas for two hours at a temperature of approximately 100° C. to generate metal sulfides. This material was then placed in a fused quartz tube and heat treated in a similar manner as that in example 1 above.

EXAMPLE 3.

SrS:Eu,Sm Vycor+sol gel glass

A third method for preparing optically transparent OSL glasses involves the use of the sol gel solution that was used in Example 2 and the porous Vycor glass of Example 1. Pieces of porous Vycor glass were soaked in the sol gel solution containing the $Sr^{2+}$, $Eu^{3+}$ and $Sm^{3+}$ salts for a period of two hours. The sol gel solution diffused throughout the volume of the porous Vycor glass. The Vycor samples were removed from the solution, dried and placed in a 300° C. oven to decompose the organic substituents. The samples were then exposed to $H_2S$ gas at 100° C. for 2 hours to form SrS. The samples were then placed into a fused quartz tube and then placed in the tube furnace. The heat treatment was identical to that described in Example 1.

EXAMPLE 4.

SrS:Eu,Sm in fused quartz

All of the methods described above utilized a fused quartz tube of approximately 2 cm in diameter to contain the glass samples to be doped in the oven. After several doping operations using a single fused quartz container, subsequent heatings of untreated (not dip-coated) fused quartz glass or porous Vycor™ glass at temperatures in excess of 1000° C. resulted in glasses with considerable OSL activity. Over a period of time, the dopant atoms diffused into the fused quartz container. Upon heating to temperatures in excess of 1000° C., dopant atoms diffused out of the container and bathed the silica glass substrates within the container in a vapor that contained the dopant atoms. The dopant atoms diffused into the silica substrates (whether fused or porous) to produce optically transparent, optically stimulable glass composites. The fused quartz container acted as a dopant delivery system.

EXAMPLE 5.

An alternative dopant delivery system to that described in Example 4 consists of loading a porous Vycor™ tube with the desired metal ion dopants followed by sulfiding at a temperature of about 100° C. A silica glass substrate is placed inside the Vycor™ tube and the tube and substrate are heated in an oven to a temperature of approximately 1100°

C. and maintained at that temperature for several hours. OSL glasses have been prepared using this technique that have considerable OSL activity. The level of the OSL activity can be adjusted by controlling the concentrations of the dopants contained in the Vycor™ tube.

EXAMPLE 6.

Alternative methods for introducing dopants into silica glass matrices include placing a piece of metal foil near the glass substrate, inside of the oven, or depositing a thin metal film directly on the substrate and heat treating at temperatures above 1000° C. The metal foil, or the film may or may not be sulfided prior to the heat treatment process.

EXAMPLE 7.

ZnS:Cu, in silica glass matrix

Another alternative dopant delivery system consists of a crucible that contains Vycor™ powder that has been loaded with the desired metal ion dopants and sulfided at approximately 100° C. The substrate to be doped is placed inside the crucible, with the powder, and heat treated to approximately 1100° C. and maintained at that temperature for several hours. The substrate may consist of a glass plate, a rod or a fiber. OSL glasses have been prepared using this technique that have considerable OSL activity. The level of the OSL activity can be adjusted by controlling the concentrations of the dopants contained in the Vycor™ powder.

A schematic of the experimental apparatus 10 used to demonstrate optically stimulated luminescence from samples prepared by the methods described above is shown in FIG. 1. Following exposure to a radiation source, such as an ultraviolet lamp, the sample 11 was placed directly in the path of a GaAlAs laser ($\lambda$=807 nm) 12. A red filter 14, selected to pass wavelengths>780 nm, and block shorter wavelengths was placed between the diode laser 12 and the sample. Blue-green filters 16, selected to pass wavelengths between 400 and 600 nm, were placed between the sample 11 and the photomultiplier tube 18. This filter combination effectively eliminated background signals from the diode laser and passed the OSL wavelengths. A photon counting system 20 was used to detect the OSL signal. The output of photon counting electronics 20 were fed into computer 22 and stored in a data file.

Figure 2:
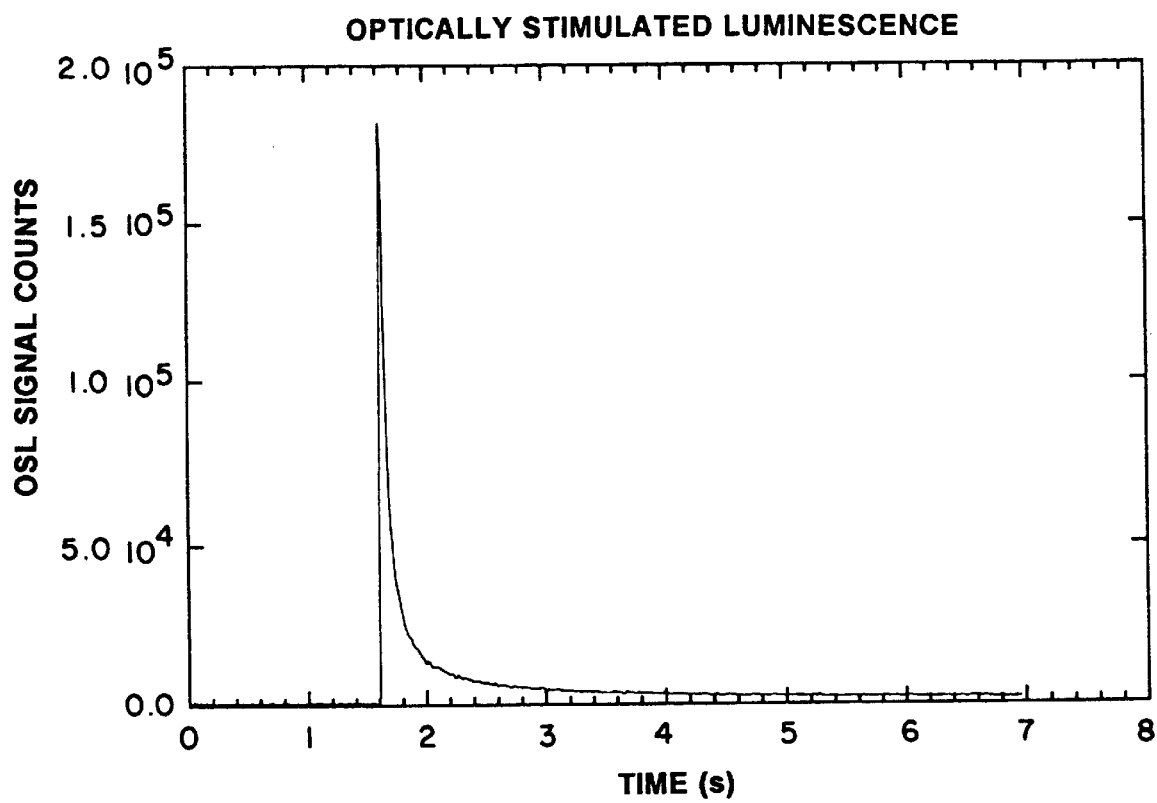
FIG. 2 is a trace of an OSL signal obtained from a doped fused quartz sample according to the present invention.

FIG. 2 shows a trace of an OSL signal obtained from a fused quartz sample prepared by the method of Example 2. The sample was exposed to an ultraviolet pen lamp for a period of 10 seconds and then placed in the reader. The OSL material displayed very little spontaneous afterglow following irradiation. When the laser was switched on the signal rose in less than 1 msec and decayed within 1 second. The OSL decay rate was directly related to the incident laser power. For this measurement, the laser power was 250 mW.

Figure 3:
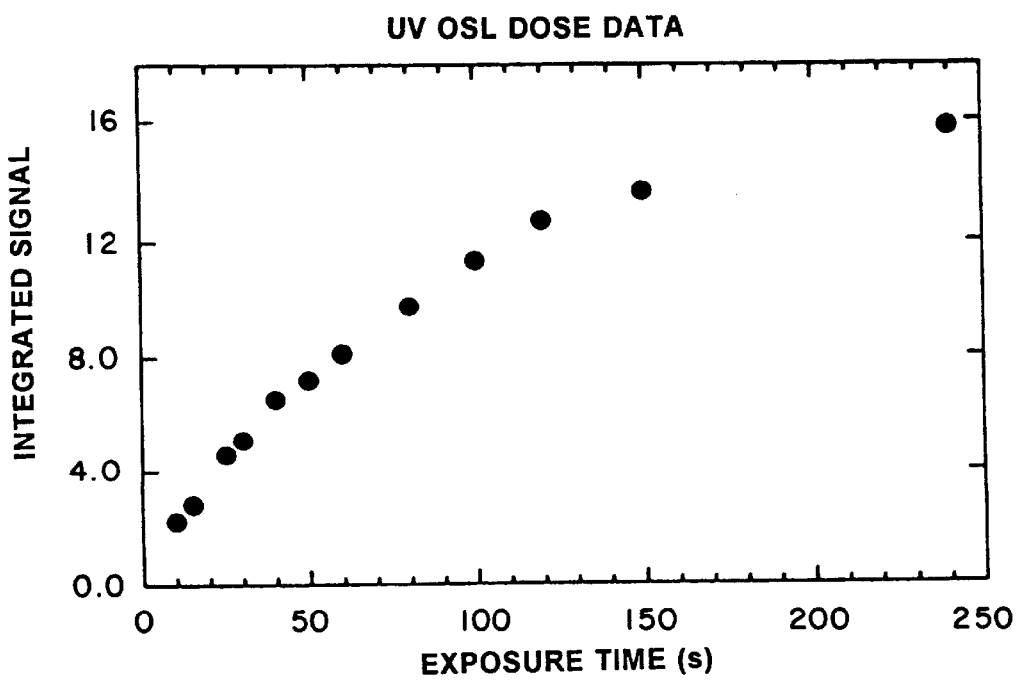
FIG. 3 is a plot of the ultraviolet dose response of the dip-coated fused quartz sample according to the present invention.

FIG. 3 shows a plot of the ultraviolet dose response of the dip coated fused quartz sample prepared by the method of Example 2. The UV source was a mercury pen lamp with an energy distribution among the emission wavelengths of 4% at 185 nm, 90% at 254 nm and 6% distributed among several longer wavelength emissions. The exposures were carried out by illuminating the samples for varying lengths of time using a lamp irradiance of approximately 150 $\mu W/cm^2$.

Figure 4:
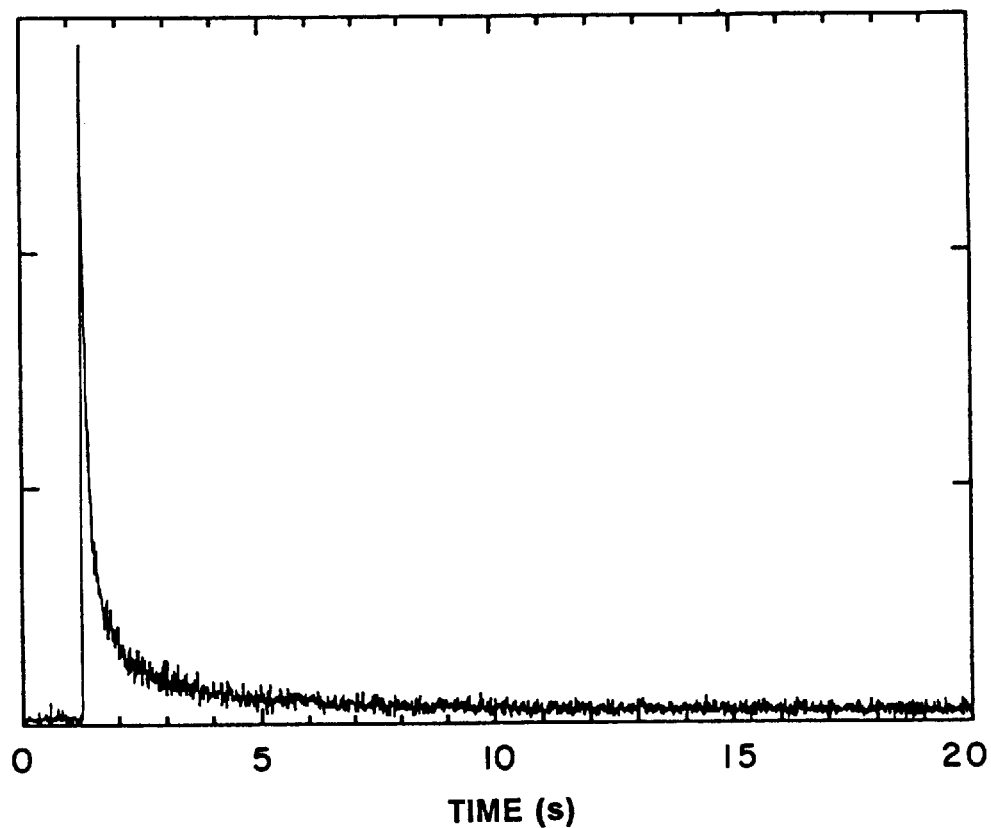
FIG. 4 shows a trace of the OSL signal obtained from a Cu-doped fused quartz glass sample according to the present invention.

FIG. 4 shows a trace of the OSL signal obtained from a Cu-doped fused quartz glass sample that was prepared by the method of Example 4 except that instead of SrS:Eu,Sm, the fused quartz tube had been "seasoned" with Cu dopants.

Figure 5:
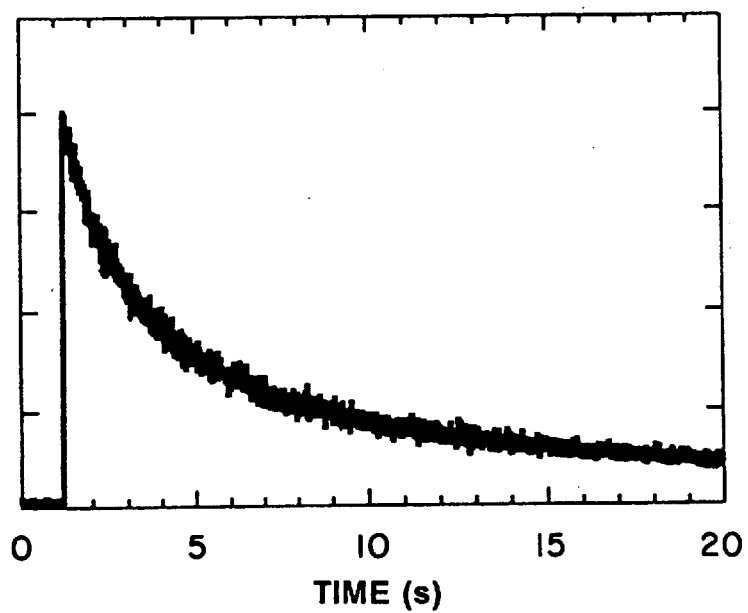
FIG. 5 shows a trace of the OSL signal obtained from a ZnS:Cu-doped Vycor™ glass according to the present invention.

FIG. 5 shows a trace of the OSL signal obtained from a ZnS:Cu-doped Vycor glass sample prepared by the method of Example 1 except that instead of Sr,Eu and Sm salts, $Zn(NO_3)_2$ and $CuSO_4$ salts were used.

Figure 6:
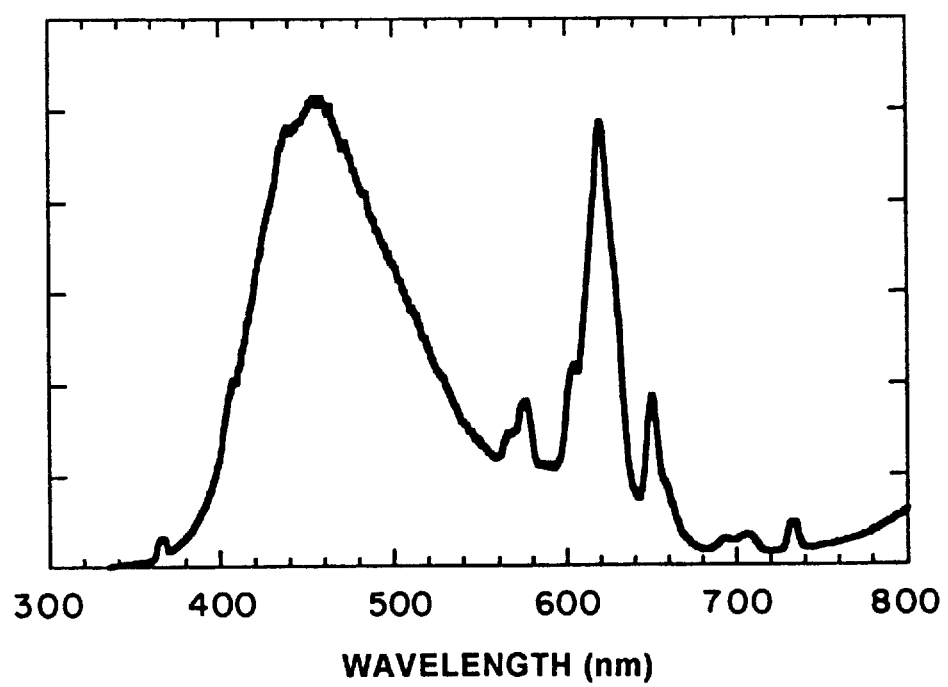
FIG. 6 is a plot of the fluorescence spectrum of a SrS:Eu,Sm-doped Vycor™ glass sample according to the present invention.

FIG. 6 shows a plot of the fluorescence spectrum of a SrS:Eu,Sm-doped Vycor glass sample prepared by the method of Example 1, excited with 254 nm light. The blue emission peak at about 450 nm is due to emission from $Eu^{2+}$. This emission is not observed from traditional bulk powder phosphors based on SrS:Eu,Sm. The traditional phosphors usually exhibit primarily red emission due to $Eu^{3+}$.

Obviously, many modifications and variations of the present invention are possible in light of the above teachings. It is therefore to be understood that, within the scope of the appended claims, the invention may be practiced otherwise than as specifically described.

What is claimed is:

1. A optically transparent, optically stimulable glass composite comprising,
    a glass matrix doped with an alkaline earth sulfide, Sm ions, and an additional dopant selected from the group consisting of Eu ions, and Ce ions, and mixtures thereof said alkaline earth sulfide and said additional dopant being present in amounts sufficient to provide said glass with optically stimulable luminescence.

2. The optically stimulable glass composite of claim 1, wherein said alkaline rare earth sulfide is selected from the group consisting of MgS, CaS, SrS, and BaS.

3. The optically stimulable glass composite of claim 1, wherein said alkaline earth sulfide, said Sm ions and said additional dopant were diffused into said glass matrix by diffusion.

4. The optically stimulable glass composite of claim 3, wherein said glass matrix, during said diffusion, is a porous glass matrix.

5. The optically stimulable glass composite of claim 3, wherein said glass matrix, during said diffusion, is a fused quartz matrix or a fused silica matrix.

6. A optically transparent, optically stimulable glass composite comprising,
    a glass matrix doped with ZnS and an additional dopant selected from the group consisting of Pb ions, Cu ions, and Mn ions, said ZnS and said additional dopant being present in an amount sufficient to provide said glass with optically stimulable luminescence.

7. The optically stimulable glass according to claim 6, wherein said additional dopant is Cu ions.

8. A optically transparent, optically stimulable glass composite comprising,
    a glass matrix doped with an amount of Cu ions sufficient to provide said glass with optically stimulable luminescence.

9. The optically transparent, optically stimulable glass composite of claim 8, wherein said glass is essentially free of metal sulfides.

10. The optically transparent, optically stimulable glass composite of claim 8, wherein said glass includes a metal sulfide component, and said Cu ions are present in an amount sufficient to activate said metal sulfide, thereby providing said glass with said optically stimulable luminescence.

11. The optically transparent, optically stimulable glass composite of claim 8, wherein said Cu ions were diffused into said glass matrix by diffusion.

12. The optically transparent, optically stimulable glass composite of claim 11, wherein said glass matrix, during said diffusion, is a porous glass matrix.

13. The optically transparent, optically stimulable glass composite of claim 11, wherein said glass matrix, during said diffusion, is a fused quartz matrix or a fused silica matrix.

14. A method of making an optically transparent, optically stimulable glass composite, comprising the steps of:
- forming an organosilicate sol-gel film on a silica glass matrix, said sol-gel film including ions of at least one dopant metal in the form a salt thereof;
- decomposing the organic constituents of said organosilicate film to leave a high silica film on said silica glass matrix, said high silica film containing said ions of at least one dopant metal in the form of said salt;
- activating said ions of said at least one dopant metal to provide said silica glass matrix with optically stimulable luminescence.

15. The method of claim 14, wherein said ions of said at least one dopant metal are a mixture of ions comprising alkaline earth ions, Sm ions, and an ions of an additional dopant metal selected from the group consisting of Eu and Ce.

16. The method of claim 14, wherein said silica glass matrix is fused quartz or a fused silica.

17. The method of claim 14, wherein said silica glass matrix is a porous silica glass, and further comprising the step of consolidating said porous silica glass during or after said activation step.

18. A method of making an optically transparent, optically stimulable glass composite, comprising the steps of:
- placing a glass matrix essentially free of metal dopants within a fused quartz tube or a fused silica tube, said fused tube having absorbed thereon, or being doped with, ions of at least one dopant metal;
- heating said tube, with said matrix therein, to a temperature of more than 1000° C., thus causing said ions of said at least one dopant metal from said tube to vaporize and diffuse into said matrix in an amount sufficient to provide said glass with optically stimulable luminescence.

19. The method of claim 18, wherein said ions of said at least one metal dopant is a mixture of ions comprising alkaline earth ions, Sm ions, and ions of an additional dopant metal selected from the group consisting of Eu and Ce.

20. The method of claim 18, wherein said ions of said at least one metal dopant comprise Cu ions.

21. The method of claim 20, wherein said glass matrix further comprises zinc sulfide.

22. A optically transparent, optically stimulable glass composite comprising,
- a glass matrix including luminescent centers and trapping centers, said trapping centers having the ability to store trapped charges until said glass matrix is exposed to an optical energy, said trapping centers being stimulable by said optical energy to, cause said trapped charges to recombine and emit light energy.

* * * * *